United States Patent
Chandrashekar et al.

(10) Patent No.: US 9,506,549 B2
(45) Date of Patent: Nov. 29, 2016

(54) DIFFERENTIAL ASSEMBLY

(71) Applicant: MERITOR COMMERCIAL VEHICLE SYSTEMS INDIA PRIVATE LIMITED, Bangalore (IN)

(72) Inventors: Supreeth Chandrashekar, Bangalore (IN); Sanjeev Kumar, Bangalore (IN)

(73) Assignee: Meritor Commercial Vehicle Systems India Private Limited, Bangalore (IN)

( * ) Notice: Subject to any disclaimer, the term of this patent is extended or adjusted under 35 U.S.C. 154(b) by 0 days.

(21) Appl. No.: 14/716,237

(22) Filed: May 19, 2015

(65) Prior Publication Data
US 2015/0337936 A1 Nov. 26, 2015

(30) Foreign Application Priority Data

May 23, 2014 (IN) .............................. 2576/CHE/2014

(51) Int. Cl.
*F16H 48/08* (2006.01)
*F16H 57/08* (2006.01)

(52) U.S. Cl.
CPC ............. *F16H 48/08* (2013.01); *F16H 57/082* (2013.01); *F16H 2048/085* (2013.01); *F16H 2048/087* (2013.01)

(58) Field of Classification Search
CPC .......................... F16H 48/08; F16H 2048/085
See application file for complete search history.

(56) References Cited

U.S. PATENT DOCUMENTS

| | | | |
|---|---|---|---|
| 1,213,258 A | 1/1917 | Reddig | |
| 1,488,509 A | 4/1924 | Masury et al. | |
| 4,182,201 A | 1/1980 | Mayhew et al. | |
| 4,577,530 A * | 3/1986 | Hickey | F16H 48/08 411/356 |
| 4,840,087 A * | 6/1989 | Welschof et al. | 475/222 |
| 2010/0184552 A1* | 7/2010 | Soybel et al. | 475/230 |
| 2010/0227727 A1* | 9/2010 | Ishikawa et al. | 475/230 |
| 2010/0234160 A1 | 9/2010 | Ishikawa et al. | |
| 2015/0059180 A1 | 3/2015 | Hirao | |

OTHER PUBLICATIONS

European Patent Office, Partial European Search Report for the corresponding European Patent Application No. 15156588.4 dated Jun. 6, 2016.
European Patent Office, Extended European Search Report for the corresponding European Patent Application No. 15156588.4 dated Sep. 27, 2016.

* cited by examiner

*Primary Examiner* — Huan Le
(74) *Attorney, Agent, or Firm* — Brooks Kushman P.C.

(57) ABSTRACT

A differential assembly having a link that may extend from a first flange member to a second flange member. A pinion gear may be rotatably disposed on a pin that may be provided with the link.

20 Claims, 3 Drawing Sheets

DIFFERENTIAL ASSEMBLY

TECHNICAL FIELD

This patent application relates to a differential assembly.

BACKGROUND

A bevel gear system is disclosed in United States Patent Publication No. 2015/0059180.

SUMMARY

In at least one embodiment, a differential assembly is provided. The differential assembly may include a first flange member, a first gear, a second flange member, a second gear, a link, a pinion gear. The first flange member may have a first hole and a first link opening. The first gear may be disposed proximate the first hole. The second flange member may have a second hole and a second link opening. The second gear may be disposed proximate the second hole. The link may include a first end portion, a second end portion, and a pin. The first end portion may be disposed in the first link opening. The second end portion may be disposed in the second link opening. The pin may be disposed between the first end portion and the second end portion. The pinion gear may be rotatably disposed on the pin and may engage the first gear and the second gear.

In at least one embodiment, a differential assembly is provided. The differential assembly may include a first flange member, a first gear, a second flange member, a second gear, a set of links, and a set of pinion gears. The first flange member may be configured to rotate about an axis. The first gear may be disposed proximate the first flange member. The second flange member may be spaced apart from the first flange member and may be configured to rotate about the axis. The second gear may be disposed proximate the second flange member. The set of links may extend from the first flange member to the second flange member. Each member of the set of links may have a pin. The set of pinion gears may engage the first gear and the second gear. Each member of the set of pinion gears may be rotatably disposed on the pin of a corresponding member of the set of links.

In at least one embodiment, a differential assembly is provided. The differential assembly may include a first flange member, a first gear, a second flange member, a second gear, a link, and a pinion gear. The first flange member may be configured to rotate about an axis. The first gear may be disposed proximate the first flange member. The second flange member may be spaced apart from the first flange member and may be configured to rotate about the axis. The second gear may be disposed proximate the first flange member. The link may extend from the first flange member to the second flange member. The link may have a pin. The pinion gear may engage the first gear and the second gear and may be rotatably disposed on the pin.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
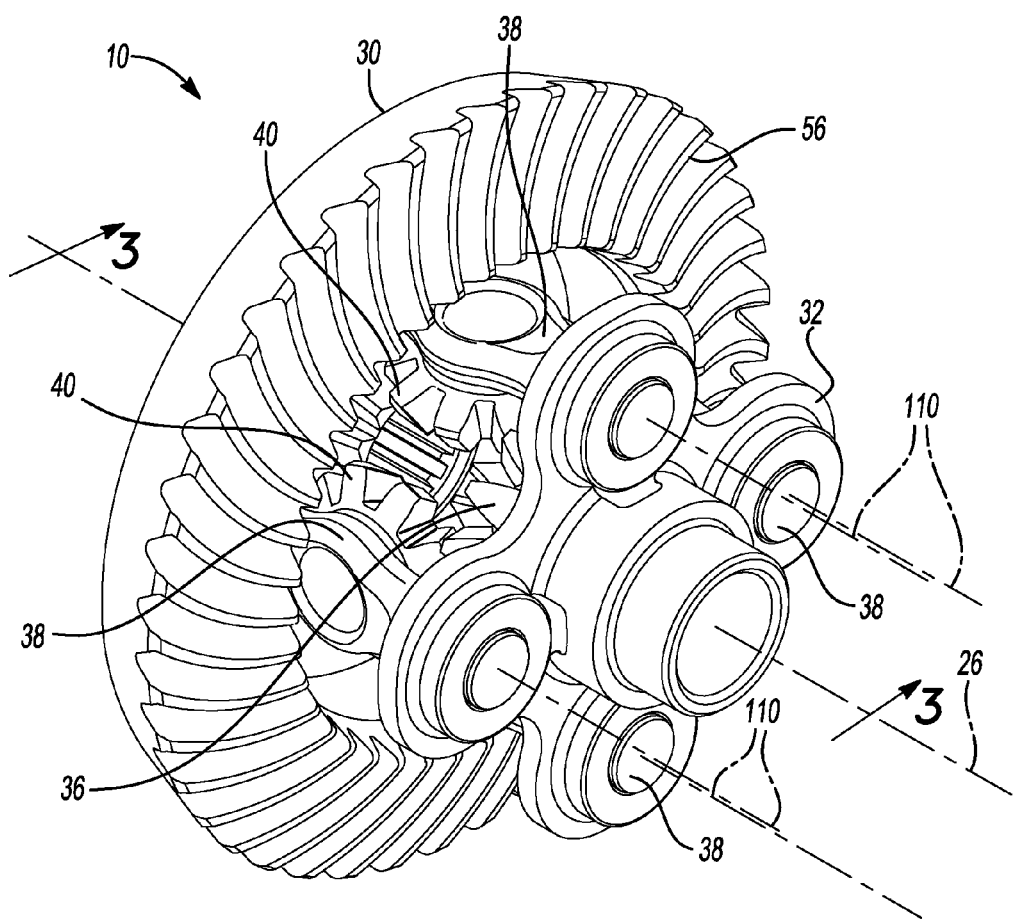
FIG. 1 is a perspective view of a differential assembly.
Figure 2:
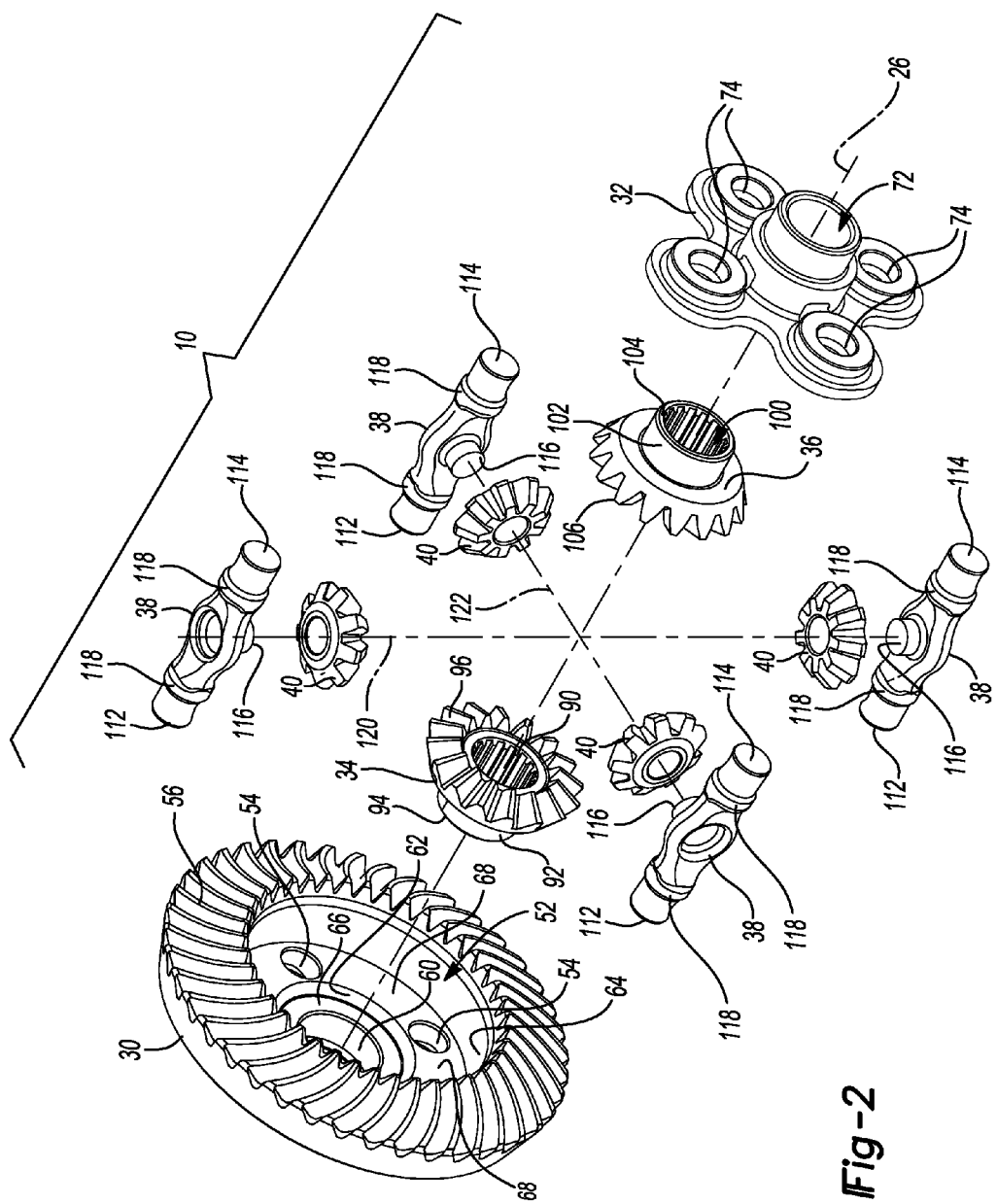
FIG. 2 is an exploded view of the differential assembly.
Figure 3:
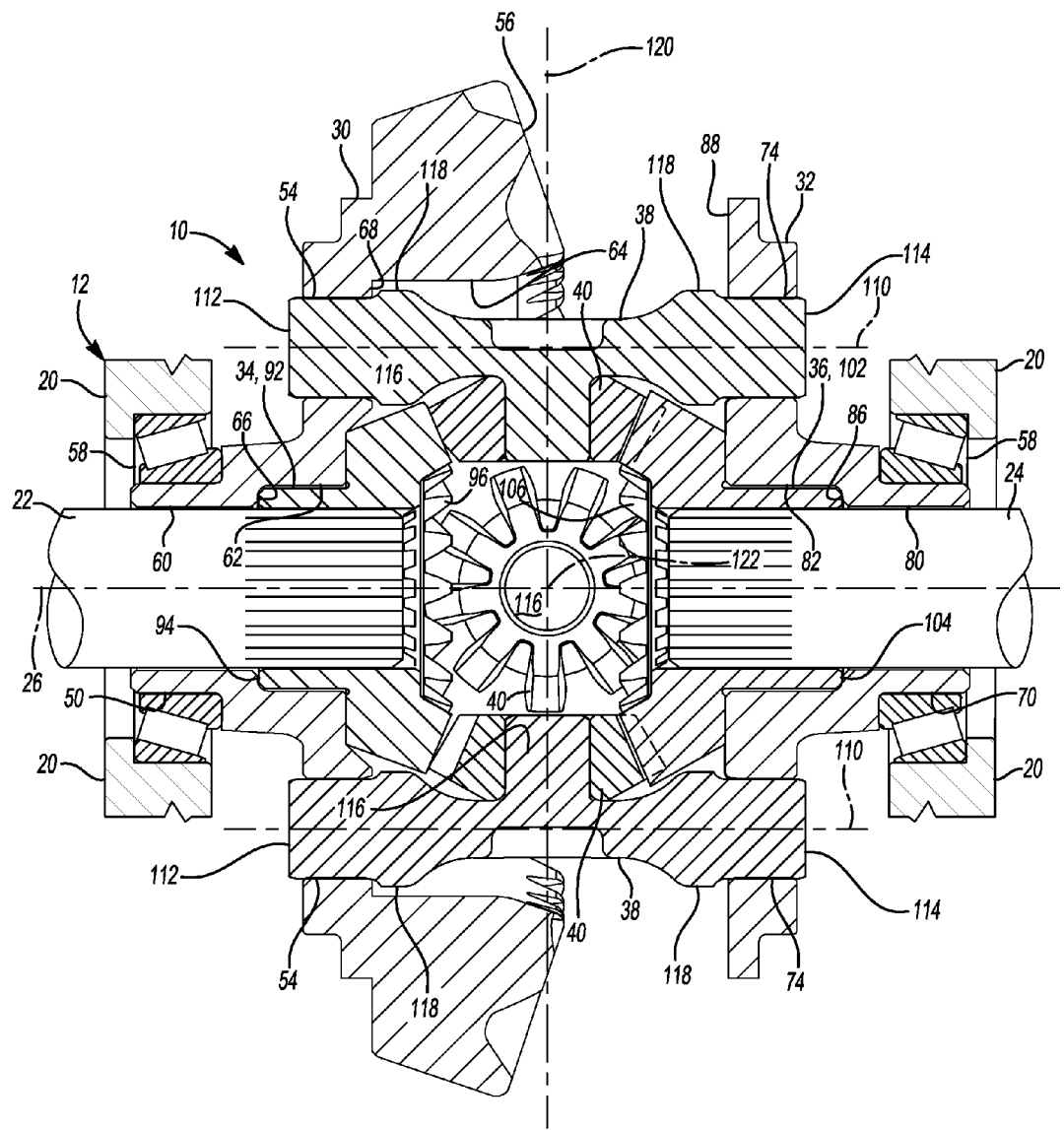
FIG. 3 is a section view of the differential assembly along section line 3-3.

Referring to FIGS. 1-3, an exemplary differential assembly 10 is shown. The differential assembly 10 may be configured for use with a vehicle, such as a motor vehicle like a truck, bus, farm equipment, military transport or weaponry vehicle, or cargo loading equipment for land, air, or marine vessels.

The differential assembly 10 may be provided with a vehicle drivetrain component or assembly, such as an axle assembly, transfer case, or wheel hub assembly. For example, the differential assembly 10 may be provided with a transfer case or may be configured as an interaxle differential unit that may be provided with an axle assembly to compensate for speed differences between different axle assemblies. The differential assembly 10 may also be provided with a wheel hub assembly that may rotatably support a vehicle wheel to provide gear reduction or gear ratio modification between a wheel axle and a traction wheel. The differential assembly 10 is described below primarily in the context of an axle assembly 12 and more specifically as a differential assembly 10 that may transmit torque to wheel axles and traction wheel assemblies and permit the wheel axles and traction wheel assemblies to rotate at different velocities.

Referring to FIG. 3, the axle assembly 12 may include a housing 20, a first shaft 22, and a second shaft 24.

The housing 20 may receive the differential assembly 10 and various components of the axle assembly 12. In addition, the housing 20 may facilitate mounting of the axle assembly 12 to the vehicle. In FIG. 3, only a portion of the housing 20 is shown to more clearly illustrate the differential assembly 10.

The first shaft 22 and the second shaft 24 may be at least partially disposed in the housing 20. In addition, the first shaft 22 and the second shaft 24 may be spaced apart from each other and may extend in opposite directions from the differential assembly 10. The first shaft 22 and the second shaft 24 may be configured to rotate about an axis 26. For instance, the first shaft 22 and the second shaft 24 may rotate independently or at different speeds about the axis 26 due to operation of the differential assembly 10. In at least one embodiment, the first shaft 22 and the second shaft 24 may each be connected to or may be configured as wheel axle that may be connected to a wheel assembly. As such, the first shaft 22 and the second shaft 24 may be rotated about the axis 26 by the differential assembly 10 to provide torque to a corresponding wheel assembly. Alternatively, the first shaft 22 may be configured as an input shaft that may receive an input torque and the second shaft 24 may be configured as an output shaft that may provide torque to another component. For instance, the first shaft 22 may receive an input torque and the second shaft 24 may provide torque to another axle assembly when configured as an interaxle differential unit. Similarly, the first shaft 22 may receive an input torque from a wheel axle and the second shaft 24 may provide torque to a wheel assembly when provided with a wheel hub assembly.

Referring primarily to FIGS. 2 and 3, the differential assembly 10 may facilitate the transfer of torque between components and/or allow components to rotate at different velocities. In at least one embodiment, the differential assembly 10 may include a first flange member 30, a second flange member 32, a first gear 34, a second gear 36, at least one link 38, and at least one pinion gear 40.

The first flange member 30 may be configured to rotate about the axis 26. In at least one embodiment, the first flange member 30 may include a bearing surface 50, a first hole 52, one or more link openings 54, and a set of gear teeth 56.

The bearing surface 50 may extend around the axis 26 and may extend around the first hole 52. The bearing surface 50 may be disposed proximate and may engage a bearing 58 that may rotatably support the first flange member 30. The bearing 58 may be mounted on another component, such as the housing 20.

The first hole 52 may be disposed along the axis 26. The first hole 52 may be configured to receive the first shaft 22 and/or the first gear 34. For example, the first hole 52 may be provided with a stepped configuration that may be at least partially defined by a first inner surface 60, a second inner surface 62, a third inner surface 64, a first step surface 66, and a second step surface 68.

The first inner surface 60 may be disposed proximate the first shaft 22. In at least one embodiment, the first inner surface 60 may be spaced apart from the first shaft 22. Alternatively, the first inner surface 60 may be provided with a spline that may mate with a corresponding spline on the first shaft 22, such as may be employed with an interaxle differential. As such, the first flange member 30 may rotate with the first shaft 22 and the first shaft 22 may receive torque from drivetrain component, such as an internal combustion engine, transmission, and transfer case.

The second inner surface 62 may be spaced apart from the first inner surface 60. The second inner surface 62 may be disposed proximate and may engage the first gear 34. The second inner surface 62 may be disposed further from the axis 26 or may have a larger diameter than the first inner surface 60.

The third inner surface 64 may be spaced apart from the second inner surface 62. The third inner surface 64 may be disposed further from the axis 26 or may have a larger diameter than the second inner surface 62. The third inner surface 64 may encircle or extend continuously around at least a portion of the first gear 34, link(s) 38, and pinion gear(s) 40.

The first step surface 66 may extend from the first inner surface 60 to the second inner surface 62. In at least one embodiment, the first gear 34 may engage the first step surface 66 to inhibit axial movement of the first gear 34 or movement of the first gear 34 along the axis 26 and toward the bearing 58 that rotatably supports the first flange member 30.

The second step surface 68 may extend from the second inner surface 62 to or toward the third inner surface 64. In at least one embodiment, the first gear 34 may engage the second step surface 68 to inhibit axial movement of the first gear 34 toward the bearing 58 that rotatably supports the first flange member 30.

One or more link openings 54 may be provided with the first flange member 30. For example, one or more link openings 54 may be disposed proximate the second step surface 68. Multiple link openings 54 may be referred to collectively as a set of link openings. In the embodiment shown, four link openings 54 are shown; however, it is contemplated that a greater or lesser number of link openings 54 may be provided. In at least one embodiment, each link opening 54 may be disposed on an opposite side of the axis 26 from another link opening 54 or directly opposite another link opening 54. In addition, each link opening 54 may be disposed at a common radial distance from the axis 26 in one or more embodiments. As such, each link opening 54 may be spaced apart from the axis 26. Each link opening 54 may be disposed further from the axis 26 than the first gear 34, the first inner surface 60, and the second inner surface 62 and may be disposed closer to the axis 26 than the third inner surface 64 and the gear teeth 56 in one or more embodiments. A link opening 54 may have any suitable configuration. For example, a link opening 54 may be configured as a through hole that may extend completely through the first flange member 30 or as a blind hole. In addition, a link opening 54 may be provided with a circular or non-circular cross section. For instance, a link opening 54 may have an oval cross section or elliptical cross section in one or more embodiments. A generally circular cross section is shown in FIGS. 1-3.

The gear teeth 56, if provided, may engage gear teeth of another component. In FIGS. 1-3, the gear teeth 56 are arranged around the axis 26 are disposed on a side of the first flange member 30 that faces toward the second flange member 32. As such, the first flange member 30 may be configured as a ring gear that may engage and receive torque from a pinion (not shown) that may receive torque from a drivetrain component, such as an internal combustion engine, transmission, or transfer case. Torque provided to the pinion may be transmitted to the gear teeth 56 and then to corresponding wheel end assemblies and traction wheels via the first shaft 22 and the second shaft 24. Alternatively, the gear teeth 56 may be arranged around the axis 26 and may be provided along a different side of the first flange member 30, such as the outside circumference of the first flange member 30. Such a configuration may be employed when the differential assembly 10 is provided with an interaxle differential unit. The gear teeth 56 may be integrally formed with the first flange member 30 or may be provided as a separate component that may be attached to the first flange member 30 in any suitable manner, such as by welding.

The second flange member 32 may be spaced apart from the first flange member 30 and may be configured to rotate about the axis 26. In at least one embodiment, the second flange member 32 may include a bearing surface 70, a second hole 72, and one or more link openings 74.

The bearing surface 70 may extend around the axis 26 and may extend around the second hole 72. The bearing surface 70 may be disposed proximate and may engage a bearing 58 that may rotatably support the second flange member 32. The bearing 58 may be mounted on another component, such as the housing 20.

The second hole 72 may be disposed along the axis 26. The second hole 72 may be configured to receive the second shaft 24 and/or the second gear 36. For example, the second hole 72 may be provided with a stepped configuration that may be at least partially defined by a first inner surface 80, a second inner surface 82, a first step surface 86, and a second step surface 88.

The first inner surface 80 may be disposed proximate the second shaft 24. In at least one embodiment, the first inner surface 80 may be spaced apart from the second shaft 24. Alternatively, the first inner surface 80 may be provided with a spline that may mate with a corresponding spline on the second shaft 24. As such, the second flange member 32 may rotate with the second shaft 24.

The second inner surface 82 may be spaced apart from the first inner surface 80. The second inner surface 82 may be disposed proximate and may engage the second gear 36. The second inner surface 82 may be disposed further from the axis 26 or may have a larger diameter than the first inner surface 80.

The first step surface 86 may extend from the first inner surface 80 to the second inner surface 82. In at least one embodiment, the second gear 36 may engage the first step surface 86 to inhibit axial movement of the second gear 36 or movement of the second gear 36 along the axis 26 and toward the bearing 58 that rotatably supports the second flange member 32.

The second step surface 88 may extend outwardly from the second inner surface 82, or away from the axis 26. In at least one embodiment, the second gear 36 may engage the second step surface 88 to inhibit axial movement of the second gear 36 toward the bearing 58 that rotatably supports the second flange member 32.

One or more link openings 74 may be provided with the second flange member 32. For example, one or more link openings 74 may be disposed proximate the second step surface 88. Each link opening 74 may be coaxially disposed or aligned with a corresponding link opening 54 on the first flange member 30. The link openings 74 on the second flange member 32 may have the same or a similar configuration and/or arrangement as the link openings 54 on the first flange member 30. For example, each link opening 54 may be spaced apart from the axis 26 and may be disposed at a common radial distance from the axis 26. In addition, each link opening 74 may be disposed further from the axis 26 than the second gear 36, the first inner surface 80, and the second inner surface 82.

The first gear 34 may be disposed proximate the first flange member 30. The first gear 34 may be disposed proximate the first hole 52 or may be at least partially disposed in the first hole 52. The first gear 34 may engage the first flange member 30 to inhibit axial movement of the first gear 34 away from the second gear 36. As such, a thrust washer may not be provided between the first gear 34 and the first flange member 30 in one or more embodiments. In at least one embodiment, the first gear 34 may include a first gear hole 90, an outer surface 92, an end surface 94, and a gear portion 96.

The first gear hole 90 may be disposed along the axis 26. The first gear hole 90 may be configured to receive the first shaft 22. The first gear 34 may rotate with the first shaft 22. For example, the first gear hole 90 may have a spline that may mate with a corresponding spline on the first shaft 22 such that the first gear 34 may not rotate with respect to the first shaft 22.

The outer surface 92 may extend around the axis 26 and around the first gear hole 90. The outer surface 92 may be disposed proximate and may engage a surface of the first flange member 30, such as the second inner surface 62.

The end surface 94 may extend from the first gear hole 90 to the outer surface 92. In one or more embodiments, the end surface 94 may be disposed proximate and may engage a surface of the first flange member 30, such as the first step surface 66.

The gear portion 96 may be disposed opposite the end surface 94. The gear portion 96 may have a set of teeth that may be arranged around the axis 26 and that may mate with one or more pinion gears 40.

The second gear 36 may be disposed proximate the second flange member 32. The second gear 36 may be disposed proximate the second hole 72 or may be at least partially disposed in the second hole 72. The second gear 36 may engage the second flange member 32 to inhibit axial movement of the second gear 36 away from the first gear 34. As such, a thrust washer may not be provided between the second gear 36 and the second flange member 32 in one or more embodiments. The second gear 36 may be spaced apart from the first gear 34 and may have a similar or identical configuration as the first gear 34. In at least one embodiment, the second gear 36 may include a second gear hole 100, an outer surface 102, an end surface 104, and a gear portion 106.

The second gear hole 100 may be disposed along the axis 26. The second gear hole 100 may be configured to receive the second shaft 24. The second gear 36 may rotate with the second shaft 24. For example, the second gear hole 100 may have a spline that may mate with a corresponding spline on the second shaft 24 such that the second gear 36 may not rotate with respect to the second shaft 24.

The outer surface 102 may extend around the axis 26 and around the second gear hole 100. The outer surface 102 may be disposed proximate and may engage a surface of the second flange member 32, such as the second inner surface 82.

The end surface 104 may extend from the second gear hole 100 to the outer surface 102. In one or more embodiments, the end surface 104 may be disposed proximate and may engage a surface of the second flange member 32, such as the second step surface 88.

The gear portion 106 may be disposed opposite the end surface 104. The gear portion 106 may have a set of teeth that may be arranged around the axis 26 and that may mate with one or more pinion gears 40.

At least one link 38 may be provided to couple the first flange member 30 to the second flange member 32. Multiple links 38 may be referred to collectively as a set of links 38. In at least one embodiment, members of the set of links 38 may be completely spaced apart from each other. Each link 38 may be arranged such that its link axis 110 may be disposed further from the axis 26 than the first gear 34, the second gear 36, and an associated pinion gear 40.

Each link 38 may extend along a link axis 110 and may include a first end portion 112, a second end portion 114, and a pin 116.

The link axis 110 may extend substantially parallel to the axis 26 in one or more embodiments. The link axis 110 may extend from the first end portion 112 to the second end portion 114.

The first end portion 112 may be disposed in a link opening 54 of the first flange member 30 such that the link 38 is fixedly coupled to the first flange member 30. For instance, the link 38 may be fixedly coupled to the first flange member 30 in any suitable manner, such as with a fastener that may engage the link 38, welding, or by press fitting the first end portion 112 into a link opening 54. In addition, a first end portion 112 with a non-circular configuration, such as an oval or elliptical configuration, may mate with a link opening 54 having a corresponding shape to help inhibit rotation of the link 38 about its link axis 110.

The second end portion 114 may be disposed opposite the first end portion 112. The second end portion 114 may be disposed in a link opening 74 of the second flange member 32 such that the link 38 is fixedly coupled to the second flange member 32. For instance, the link 38 may be fixedly coupled to the second flange member 32 in any suitable manner, such as with a fastener that may engage the link 38 or by press fitting the second end portion 114 into a link opening 74. In addition, a second end portion 114 with a non-circular configuration, such as an oval or elliptical configuration, may mate with a link opening 74 having a corresponding shape to help inhibit rotation of the link 38 about its link axis 110.

The link 38 may have one or more enlarged portions 118 that may facilitate positioning of the link 38 in a corresponding link opening 54, 74. As is best shown in FIG. 2, the link 38 may have a first enlarged portion 118 that may be disposed between the first end portion 112 and the pin 116 and a second enlarged portion 118 that may be disposed between the second end portion 114 and the pin 116. The enlarged portions 118 may be larger than a corresponding link opening 54, 74 and may engage the first flange member 30 or the second flange member 32 to control positioning of the link 38 or limit the depth of insertion of the first end portion 112 or second end portion 114 into corresponding link openings 54, 74, respectively.

The pin 116 may be disposed between and may be spaced apart from the first end portion 112 and the second end portion 114. The pin 116 may extend toward and may be spaced apart from the axis 26. For instance, the pin 116 may extend along a pin axis that may be radially disposed about the axis 26. The members of the set of links 38 may be arranged such that the pin 116 of each link 38 may be coaxially disposed with the pin 116 of another link 38. For instance, two pins 116 may be arranged along a first pin axis 120 that may intersect and may be disposed substantially perpendicular to the axis 26. Two additional pins 116 may be arranged along a second pin axis 122 that may intersect and may be disposed substantially perpendicular to the axis 26 and/or the first pin axis 120.

A pinion gear 40 may be rotatably disposed on a pin 116 of a link 38. For instance, a pinion gear 40 may have a hole that may receive a pin 116. Optionally, a set of roller bearings may be disposed between the pinion gear 40 and each pin 116 to facilitate rotation of a pinion gear 40. Multiple pinion gears 40 may be referred to collectively as a set of pinion gears 40. In the embodiment shown, four pinion gears 40 are provided such that a pinion gear 40 is rotatably disposed on the pin 116 of a different corresponding link 38. In at least one embodiment, two pinion gears 40 may rotate about pins 116 that extend along the first pin axis 120 and two pinion gears 40 may rotate about pins 116 that extend along the second pin axis 122. A pinion gear 40 may have a set of teeth that mate with teeth of the gear portion 96 of the first gear 34 and teeth of the gear portion 106 of the second gear 36.

A pinion gear 40 may engage an associated link 38 to inhibit movement of the pinion gear 40 away from the axis 26. For example, the pinion gear 40 may engage a link surface that may be disposed near the base of the pin 116 to inhibit movement of the pinion gear 40 away from the axis 26 and inhibit disengagement of the pinion gear 40 from the first gear 34 and the second gear 36. In one or more embodiments, the pinion gear 40 may be disposed on a corresponding pin 116 without additional fasteners or thrust washers that may otherwise be provided to retain the pinion gear 40. Elimination of fasteners may be facilitated by engagement of the pinion gears 40 with the first gear 34 and the second gear 36 and the positioning of the link 38 further from the axis 26 than the pinion gear 40.

The differential assembly described above may be provided with fewer parts as compared to a differential assembly that may employ a spider to support pinion gears. For example, fasteners and thrust washers that may be used to secure pinion gears to the spider may be eliminated, thereby reducing complexity, cost, and weight. Reduced weight may reduce the mass moment of inertia of the differential assembly, which may allow faster acceleration and deceleration of a vehicle and improved differential assembly performance. The reduced number of parts and configuration described above may also provide a more open design that may increase the amount of lubricant that may be provided to gear surfaces, which may improve performance and product life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential assembly comprising:
    a first flange member having a first hole and a first link opening;
    a first gear disposed proximate the first hole;
    a second flange member having a second hole and a second link opening;
    a second gear disposed proximate the second hole;
    a link that includes:
        a first end portion disposed in the first link opening,
        a second end portion disposed in the second link opening, and
        a pin disposed between the first end portion and the second end portion; and
    a pinion gear that is rotatably disposed on the pin and that engages the first gear and the second gear.

2. The differential assembly of claim 1 wherein the link is fixedly positioned with respect to the first flange member and the second flange member.

3. The differential assembly of claim 1 wherein the first gear is at least partially disposed in the first hole.

4. The differential assembly of claim 1 wherein the second gear is at least partially disposed in the second hole.

5. The differential assembly of claim 1 wherein the first gear and the second gear are spaced apart from each other and rotate about an axis.

6. The differential assembly of claim 5 wherein the first hole is disposed along the axis and the first link opening is spaced apart from the axis.

7. The differential assembly of claim 5 wherein the pin extends toward and is spaced apart from the axis.

8. The differential assembly of claim 5 wherein the first gear has a first gear hole that receives a first shaft such that the first gear does not rotate with respect to the first shaft.

9. The differential assembly of claim 8 wherein the second gear has a second gear hole that receives a second shaft such that the second gear does not rotate with respect to the second shaft, wherein the first shaft and the second shaft are configured to rotate independently about the axis.

10. A differential assembly comprising:
    a first flange member that is configured to rotate about an axis;
    a first gear that is disposed proximate the first flange member;
    a second flange member that is spaced apart from the first flange member and configured to rotate about the axis;
    a second gear disposed proximate the second flange member;
    a set of links that extend from the first flange member to the second flange member, wherein each member of the set of links has a pin; and a set of pinion gears that engage the first gear and the second gear, wherein each member of the set of pinion gears is rotatably disposed on the pin of a corresponding member of the set of links.

11. The differential assembly of claim 10 wherein the first flange member includes a set of gear teeth that are arranged around the axis.

12. The differential assembly of claim 10 wherein each member of the set of links is fixedly coupled to the first flange member and the second flange member.

13. The differential assembly of claim 10 wherein each member of the set of links is spaced apart from the first gear and the second gear and completely spaced apart from each other.

14. The differential assembly of claim 10 wherein each member of the set of links extends along a corresponding link axis that is disposed substantially parallel to the axis.

15. The differential assembly of claim 10 wherein the members of the set of links are arranged such that the pin of each link is coaxially disposed with the pin of another link.

16. The differential assembly of claim 10 wherein the first flange member has a first hole, the first gear has a first gear hole, and wherein a first shaft is disposed in the first hole and the first gear hole.

17. The differential assembly of claim 16 wherein the first gear does not rotate with respect to the first shaft.

18. The differential assembly of claim 10 wherein the second flange member has a second hole, the second gear has a second gear hole, and wherein a second shaft is disposed in the second hole and the second gear hole.

19. The differential assembly of claim 18 wherein the second gear does not rotate with respect to the second shaft.

20. A differential assembly comprising:
- a first flange member that is configured to rotate about an axis;
- a first gear that is disposed proximate the first flange member;
- a second flange member that is spaced apart from the first flange member and configured to rotate about the axis;
- a second gear disposed proximate the second flange member;
- a link that extends from the first flange member to the second flange member, wherein the link has a pin; and
- a pinion gear that engages the first gear and the second gear, wherein the pinion gear is rotatably disposed on the pin.

* * * * *